US009483368B2

(12) United States Patent
Yang

(10) Patent No.: US 9,483,368 B2
(45) Date of Patent: Nov. 1, 2016

(54) METHOD, APPARATUS, AND SYSTEM FOR HANDLING VIRTUAL MACHINE INTERNAL FAULT

(71) Applicant: Huawei Technologies Co., Ltd., Shenzhen (CN)

(72) Inventor: Xiaowei Yang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 406 days.

(21) Appl. No.: 14/104,802

(22) Filed: Dec. 12, 2013

(65) Prior Publication Data

US 2014/0101489 A1    Apr. 10, 2014

Related U.S. Application Data

(63) Continuation of application No. PCT/CN2013/074074, filed on Apr. 11, 2013.

(30) Foreign Application Priority Data

Sep. 17, 2012 (CN) .......................... 2012 1 0345633

(51) Int. Cl.
*G06F 11/00* (2006.01)
*G06F 11/14* (2006.01)
(Continued)

(52) U.S. Cl.
CPC ....... *G06F 11/1484* (2013.01); *G06F 9/45533* (2013.01); *G06F 9/45558* (2013.01);
(Continued)

(58) Field of Classification Search
CPC ........... G06F 11/1484; G06F 11/0793; G06F 11/0772; G06F 11/0712; G06F 11/0757; G06F 11/0751; G06F 9/45558; G06F 9/45533; G06F 2009/45591
USPC ........................ 714/38.13, 25, 34, 38.1, 47.1
See application file for complete search history.

(56) References Cited

U.S. PATENT DOCUMENTS

| 8,381,033 B2 * | 2/2013 | Franklin ............. G06F 11/0712 714/25 |
| 2004/0003323 A1 | 1/2004 | Bennett et al. |

(Continued)

FOREIGN PATENT DOCUMENTS

| CN | 1679001 A | 10/2005 |
| CN | 1692332 A | 11/2005 |

(Continued)

OTHER PUBLICATIONS

IBM, "Configuring Remote Crash Dump on Linux Systems," First Edition, Aug. 2009, 26 pages.
(Continued)

*Primary Examiner* — Joseph D Manoskey
(74) *Attorney, Agent, or Firm* — Conley Rose, P.C.; Grant Rodolph

(57) ABSTRACT

A method, an apparatus, and a system for handling a virtual machine internal fault. The method includes: monitoring, by a virtual machine internal fault detecting apparatus, a state of a virtual machine operating system; when detecting that the virtual machine operating system encounters an exception, obtaining, by an exception catching module in the virtual machine internal fault detecting apparatus, exception information corresponding to the exception according to a context of the virtual machine operating system; and reporting, by the exception catching module, the exception information to a virtual machine monitoring apparatus, so that the virtual machine monitoring apparatus determines, according to the exception information, a policy for resolving the exception corresponding to the exception information, and resolves the exception corresponding to the exception information by using the policy. The present invention is applicable to a virtualized environment having a virtual machine.

14 Claims, 7 Drawing Sheets

(51) Int. Cl.
*G06F 9/455* (2006.01)
*G06F 11/07* (2006.01)

(52) U.S. Cl.
CPC ....... *G06F11/0712* (2013.01); *G06F 11/0772* (2013.01); *G06F 11/0793* (2013.01); *G06F 2009/45591* (2013.01)

(56) References Cited

U.S. PATENT DOCUMENTS

| | | | |
|---|---|---|---|
| 2004/0003324 | A1 | 1/2004 | Uhlig et al. |
| 2004/0153833 | A1 | 8/2004 | Deacon et al. |
| 2005/0060703 | A1 | 3/2005 | Bennett et al. |
| 2006/0005084 | A1* | 1/2006 | Neiger ................ G06F 9/45533 714/47.1 |
| 2007/0283195 | A1 | 12/2007 | Reinhardt et al. |
| 2009/0077361 | A1 | 3/2009 | Neiger et al. |
| 2009/0172799 | A1 | 7/2009 | Morgan |
| 2010/0058108 | A1 | 3/2010 | Nammatsu et al. |
| 2011/0219373 | A1* | 9/2011 | Nam ....................... G06F 9/455 718/1 |
| 2011/0231710 | A1 | 9/2011 | Laor |
| 2014/0006877 | A1* | 1/2014 | Zhu ..................... G06F 11/3466 714/45 |

FOREIGN PATENT DOCUMENTS

| | | | |
|---|---|---|---|
| CN | 1704908 | A | 12/2005 |
| CN | 101364184 | A | 2/2009 |
| CN | 101449244 | A | 6/2009 |
| CN | 101452420 | A | 6/2009 |
| CN | 101493788 | A | 7/2009 |
| CN | 101872323 | A | 10/2010 |
| CN | 101887393 | A | 11/2010 |
| CN | 101923507 | A | 12/2010 |
| CN | 102053873 | A | 5/2011 |
| CN | 102073529 | A | 5/2011 |
| CN | 102325192 | A | 1/2012 |
| CN | 102662788 | A | 9/2012 |
| CN | 102902599 | A | 1/2013 |
| EP | 2557498 | A1 | 2/2013 |

OTHER PUBLICATIONS

Hughes, J., "Devil's in the details . . . ," Microsoft Enterprise Platforms Support, Windows Server Core Team, Mar. 4, 2011, 12 pages.
Foreign Communication From A Counterpart Application, European Application No. 13801458.4, Extended European Search Report dated Apr. 2, 2015, 7 pages.
Foreign Communication From A Counterpart Application, Chinese Application No. 201210345633.7, Chinese Office Action dated Jul. 1, 2014, 14 pages.
Chun-Guang, W., "The Research and Implementation of Operating Systems Runtime Monitoring and Controlling Technology based on Hypervisor," Dec. 2009, 76 pages.
Chun-Guang, W., "The Research and Implementation of Operating Systems Runtime Monitoring and Controlling Technology based on Hypervisor," English Translation, Jul. 24, 2014, 13 pages.
Foreign Communication From A Counterpart Application, PCT Application No. PCT/CN2013/074074, English Translation of International Search Report dated Jul. 18, 2013, 2 pages.
Foreign Communication From a Counterpart Application, PCT Application No. PCT/CN2013/074074, Written Opinion dated Jul. 18, 2013, 5 pages.
Partial English Translation and Abstract of Chinese Patent Application No. CN101452420A, Part 1, Jul. 21, 2014, 5 pages.
Partial English Translation and Abstract of Chinese Patent Application No. CN101452420A, Part 2, Jul. 21, 2014, 3 pages.
Partial English Translation and Abstract of Chinese Patent Application No. CN101872323A, Jun. 30, 2014, 4 pages.
Partial English Translation and Abstract of Chinese Patent Application No. CN101887393A, Jun. 30, 2014, 8 pages.
Partial English Translation and Abstract of Chinese Patent Application No. CN102053873A, Jun. 30, 2014, 5 pages.
Partial English Translation and Abstract of Chinese Patent Application No. CN102325192A, Jun. 30, 2014, 5 pages.
Partial English Translation and Abstract of Chinese Patent Application No. CN102662788A, Jun. 30, 2014, 2 pages.

* cited by examiner

METHOD, APPARATUS, AND SYSTEM FOR HANDLING VIRTUAL MACHINE INTERNAL FAULT

CROSS-REFERENCE TO RELATED APPLICATIONS

This application is a continuation of International Application No. PCT/CN2013/074074, filed on Apr. 11, 2013, which claims priority to Chinese Patent Application No. 201210345633.7, filed on Sep. 17, 2012, both of which are hereby incorporated by reference in their entireties.

FIELD OF THE INVENTION

The present invention relates to the field of communication technologies, and in particular, to a method, an apparatus, and a system for handling a virtual machine internal fault.

BACKGROUND OF THE INVENTION

In a virtualized environment, a host machine normally runs one or more virtual machines thereon, and the host machine normally is required to know an internal running state of a virtual machine. The host machine, when running many virtual machines thereon, normally cannot view the internal running state of each virtual machine all the time. When a virtual machine encounters an internal exception (for example, the virtual machine crashes or goes into a blue screen) and cannot be detected by the host machine, the host machine does not perform processing on the virtual machine for a long period of time, resulting in that a service in the virtual machine is interrupted for a long period of time, which wastes resources such as memory of the host machine. Therefore, it is very necessary for the host machine to know whether an internal exception occurs on the virtual machine.

At present, a virtual machine normally is capable of periodically sending heartbeat information of the virtual machine to the host machine by using software. For example, a virtual machine sends heartbeat information of the virtual machine to a host machine every second by using VMware Tools in virtual machine software VMware, and a virtual machine monitoring module in the host machine detects, at intervals, whether heartbeat information is sent to the host machine within the period (for example, the virtual machine monitoring module detects, every 20 seconds, whether heartbeat information is sent to the host machine within the 20 seconds). If the virtual machine monitoring module detects no heartbeat information within a period of time, the virtual machine monitoring module determines that an internal running fault occurs on the virtual machine. In such cases, the virtual machine monitoring module may control the virtual machine to reset. A specific interaction process thereof is shown in FIG. 1.

During the implementation of embodiments of the present invention, the inventor finds that the prior art has at least the following problem.

The method of determining, by using heartbeat information, whether an internal running fault occurs on a virtual machine is not accurate, and the virtual machine monitoring module cannot detect, in a timely manner, the internal running fault that occurs on the virtual machine. In addition, the virtual machine is restored by resetting the virtual machine, and when the virtual machine runs again, a fault may still be caused by the same reason that causes the previous fault.

SUMMARY OF THE INVENTION

Embodiments of the present invention provide a method, an apparatus, and a system for handling a virtual machine internal fault, which can solve the problem in the prior art that the method of determining, by using heartbeat information, whether an internal running fault occurs on a virtual machine is not accurate, a virtual machine monitoring module cannot find, in a timely manner, the internal running fault that occurs on the virtual machine, and when the virtual machine runs again, a fault may still be caused by the same reason that causes the previous fault.

To achieve the above objective, the present invention adopts the following technical solutions.

In a first aspect, an embodiment of the present invention provides a method for handling a virtual machine internal fault, including: monitoring, by a virtual machine internal fault detecting apparatus, a state of a virtual machine operating system; when detecting that the virtual machine operating system encounters an exception, obtaining, by an exception catching module in the virtual machine internal fault detecting apparatus, exception information corresponding to the exception according to a context of the virtual machine operating system, where the exception catching module is loaded to the virtual machine operating system when the virtual machine operating system is started; and reporting, by the exception catching module, the exception information to a virtual machine monitoring apparatus, so that the virtual machine monitoring apparatus determines, according to the exception information, a policy for resolving the exception corresponding to the exception information, and resolves the exception corresponding to the exception information by using the policy.

According to the first aspect, in a first implementation manner of the first aspect, the exception catching module includes a kernel mode function registered with the virtual machine operating system; and before the obtaining, by an exception catching module, exception information corresponding to the exception according to a context of the virtual machine operating system, the method includes: registering, by the exception catching module, a callback function with the virtual machine operating system, where the callback function is used when an exception occurs; and the obtaining, by an exception catching module, exception information corresponding to the exception according to a context of the virtual machine operating system includes determining, by the exception catching module, a type of the exception according to the context of the virtual machine operating system by using the callback function, and locating the exception.

According to the first aspect, in a second implementation manner of the first aspect, the exception catching module is an interrupt handling function registered with a non-maskable interrupt in the virtual machine operating system; and the obtaining, by an exception catching module, exception information corresponding to the exception according to a context of the virtual machine operating system includes determining, by the exception catching module, a type of the exception according to a context of a non-maskable interrupt after receiving the non-maskable interrupt sent by the virtual machine monitoring apparatus, and locating the exception.

According to the second implementation manner of the first aspect, in a third implementation manner of the first aspect, before the determining, by the exception catching module, a type of the exception according to a context of a non-maskable interrupt after receiving the non-maskable interrupt sent by the virtual machine monitoring apparatus, and locating the exception, the method includes: receiving, by the exception catching module, a user-defined function configured by a user, where the user-defined function is used to require the exception catching module to provide information related to a virtual machine corresponding to the user-defined function; and the method further includes performing, by the exception catching module, the user-defined function in the context of the non-maskable interrupt after receiving the non-maskable interrupt sent by the virtual machine monitoring apparatus, so that the exception catching module catches the virtual machine-related information; and reporting, by the exception catching module, the virtual machine-related information to the virtual machine monitoring apparatus.

In a second aspect, an embodiment of the present invention provides a method for handling a virtual machine internal fault, including: receiving, by a virtual machine monitoring apparatus, exception information sent by an exception catching module in a virtual machine internal fault detecting apparatus; determining, by the virtual machine monitoring apparatus and according to the exception information, a policy for resolving an exception corresponding to the exception information; and resolving, by the virtual machine monitoring apparatus, the exception corresponding to the exception information by using the policy.

According to the second aspect, in a first implementation manner of the second aspect, before the receiving, by a virtual machine monitoring apparatus, exception information sent by an exception catching module in a virtual machine internal fault detecting apparatus, the method includes receiving, by the virtual machine monitoring apparatus, exception handling information configured by a user, where the exception handling information includes handling policies corresponding to multiple exception types.

According to the first implementation manner of the second aspect, in a second implementation manner of the second aspect, the exception information includes an exception type and a location where the exception occurs, and the determining, by the virtual machine monitoring apparatus and according to the exception information, a policy for resolving an exception corresponding to the exception information includes: searching, by the virtual machine monitoring apparatus, the handling policies corresponding to the multiple exception types in the exception handling information for the policy corresponding to the exception type in the exception information; and the resolving, by the virtual machine monitoring apparatus, the exception corresponding to the exception information by using the policy includes implementing, by the virtual machine monitoring apparatus and according to the location where the exception occurs, the policy corresponding to the exception type in the exception information at the location where the exception occurs; or sending, by the virtual machine monitoring apparatus, the policy corresponding to the exception type in the exception information to a virtual machine operation executing module in a virtual machine, so that the virtual machine operation executing module implements the policy corresponding to the exception type in the exception information at the location where the exception occurs.

According to the second implementation manner of the second aspect, in a third implementation manner of the second aspect, before the receiving, by a virtual machine monitoring apparatus, exception information sent by an exception catching module in a virtual machine internal fault detecting apparatus, the method includes setting, by the virtual machine monitoring apparatus, a non-maskable interrupt flag bit on the virtual machine monitoring apparatus to indicate that a non-maskable interrupt exists in a virtual machine operating system; and sending, by the virtual machine monitoring apparatus, the non-maskable interrupt to the exception catching module at a predefined frequency.

According to the third implementation manner of the second aspect, in a fourth implementation manner of the second aspect, after the sending, by the virtual machine monitoring apparatus, the non-maskable interrupt to the exception catching module at a predefined frequency, the method includes receiving, by the virtual machine monitoring apparatus, virtual machine-related information sent by the exception catching module.

In a third aspect, an embodiment of the present invention provides a virtual machine internal fault detecting apparatus, including: a monitoring module configured to monitor a state of a virtual machine operating system; and an exception catching module configured to obtain, when the monitoring module detects that the virtual machine operating system encounters an exception, exception information corresponding to the exception according to a context of the virtual machine operating system, where the exception catching module is loaded to the virtual machine operating system when the virtual machine operating system is started; where the exception catching module is further configured to report the exception information to a virtual machine monitoring apparatus, so that the virtual machine monitoring apparatus determines, according to the exception information, a policy for resolving the exception corresponding to the exception information, and resolves the exception corresponding to the exception information by using the policy.

According to the third aspect, in a first implementation manner of the third aspect, the exception catching module includes a kernel mode function registered with the virtual machine operating system; and the exception catching module includes: a callback function registering unit configured to register a callback function with the virtual machine operating system, where the callback function is used when an exception occurs; and the exception catching module is specifically configured to determine a type of the exception according to the context of the virtual machine operating system by using the callback function, and locate the exception.

According to the third aspect, in a second implementation manner of the third aspect, the exception catching module is an interrupt handling function registered with a non-maskable interrupt in the virtual machine operating system; and the exception catching module is specifically configured to determine a type of the exception according to a context of a non-maskable interrupt after receiving the non-maskable interrupt sent by the virtual machine monitoring apparatus, and locate the exception.

According to the second implementation manner of the third aspect, in a third implementation manner of the third aspect, the exception catching module includes: a first receiving unit configured to receive a user-defined function configured by a user, where the user-defined function is used to require the exception catching module to provide information related to a virtual machine corresponding to the user-defined function; a user-defined function processing unit configured to perform the user-defined function in the context of the non-maskable interrupt after receiving the non-maskable interrupt sent by the virtual machine monitoring apparatus, so that the exception catching module catches the virtual machine-related information; and a first sending unit configured to report the virtual machine-related information to the virtual machine monitoring apparatus.

In a fourth aspect, an embodiment of the present invention provides a virtual machine monitoring apparatus, including: a first receiving module configured to receive exception information sent by an exception catching module in a virtual machine internal fault detecting apparatus; a policy configuring module configured to determine, according to the exception information, a policy for resolving an exception corresponding to the exception information; and an exception handling module configured to resolve the exception corresponding to the exception information by using the policy.

According to the fourth aspect, in a first implementation manner of the fourth aspect, the virtual machine monitoring apparatus includes a second receiving module configured to receive exception handling information configured by a user, where the exception handling information includes handling policies corresponding to multiple exception types.

According to the first implementation manner of the fourth aspect, in a second implementation manner of the fourth aspect, the exception information includes an exception type and a location where the exception occurs, and the policy configuring module is specifically configured to search the handling policies corresponding to the multiple exception types in the exception handling information for a policy corresponding to the exception type in the exception information; and the exception handling module includes a processing unit configured to implement, according to the location where the exception occurs, the policy corresponding to the exception type in the exception information at the location where the exception occurs; and a second sending unit configured to send the policy corresponding to the exception type in the exception information to a virtual machine operation executing module in a virtual machine, so that the virtual machine operation executing module implements the policy corresponding to the exception type in the exception information at the location where the exception occurs.

According to the second implementation manner of the fourth aspect, in a third implementation manner of the fourth aspect, the virtual machine monitoring apparatus further includes: a first setting module configured to set a non-maskable interrupt flag bit on the virtual machine monitoring apparatus to indicate that a non-maskable interrupt exists in a virtual machine operating system; and a first sending module configured to send the non-maskable interrupt to the exception catching module at a predefined frequency.

According to the third implementation manner of the fourth aspect, in a fourth implementation manner of the fourth aspect, the virtual machine monitoring apparatus further includes a third receiving module configured to receive virtual machine-related information sent by the exception catching module.

In a fifth aspect, an embodiment of the present invention provides a system for handling a virtual machine internal fault, including a virtual machine internal fault detecting apparatus and a virtual machine monitoring apparatus, where the virtual machine internal fault detecting apparatus is configured to monitor a state of a virtual machine operating system; when detecting that the virtual machine operating system encounters an exception, obtain exception information corresponding to the exception according to a context of the virtual machine operating system and report the exception information to the virtual machine monitoring apparatus; and the virtual machine monitoring apparatus is configured to receive the exception information sent by the exception catching module in the virtual machine internal fault detecting apparatus; determine, according to the exception information, a policy for resolving the exception corresponding to the exception information; and resolve the exception corresponding to the exception information by using the policy.

In the method, the apparatus, and the system for handling a virtual machine internal fault according to the embodiments of the present invention, a virtual machine internal fault detecting apparatus monitors a state of a virtual machine operating system; when detecting that the virtual machine operating system encounters an exception, an exception catching module in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiments of the present invention, by using the obtained exception information, make it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

BRIEF DESCRIPTION OF DRAWINGS

To illustrate the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

To make the advantages of the technical solutions of the present invention clearer, the following describes the present invention in detail with reference to accompanying drawings and embodiments.

Figure 1:
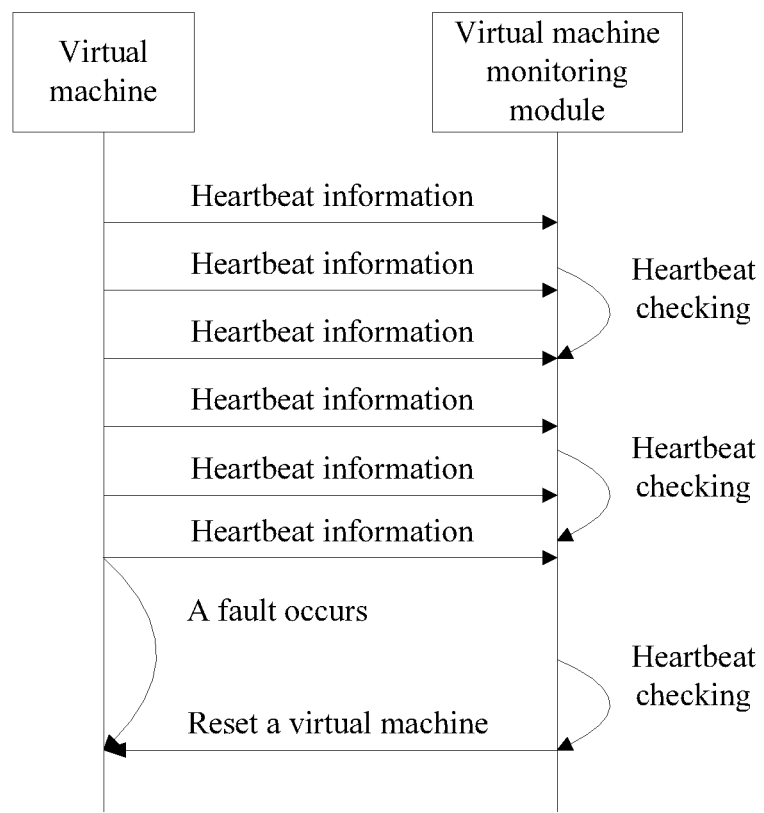
FIG. 1 is a schematic diagram of information interaction between a virtual machine and a virtual machine monitoring module in the prior art.
Figure 2:
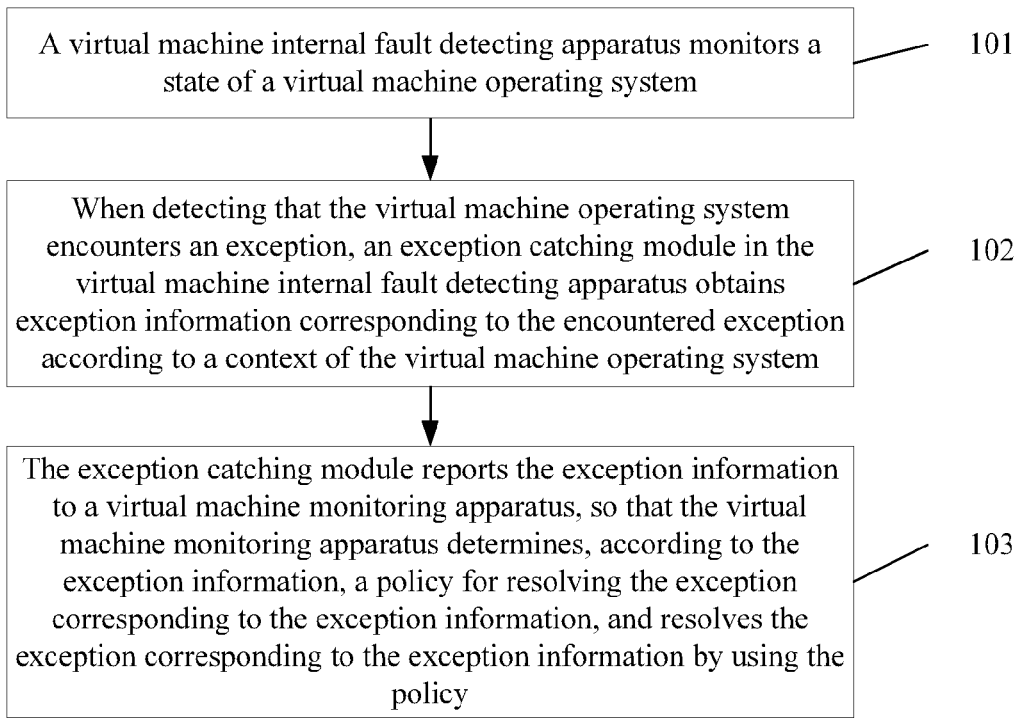
FIG. 2 is a first flowchart of a method for handling a virtual machine internal fault according to an embodiment of the present invention.

As shown in FIG. 2, an embodiment of the present invention provides a method for handling a virtual machine internal fault, where the method includes the following steps when described from the perspective of a virtual machine internal fault detecting apparatus side.

101. A virtual machine internal fault detecting apparatus monitors a state of a virtual machine operating system.

The virtual machine operating system normally has two states: normal working and exception occurred.

102. When detecting that the virtual machine operating system encounters an exception, an exception catching module in the virtual machine internal fault detecting apparatus obtains exception information corresponding to the exception according to a context of the virtual machine operating system.

The exception catching module is loaded to the virtual machine operating system when the virtual machine operating system is started. The exception catching module may include a kernel mode function registered with the virtual machine operating system, and may also be an interrupt handling function registered with a non-maskable interrupt in the virtual machine operating system. The exception information may include an exception type (such as a system deadlock or memory insufficiency) and a location where the exception occurs (for example, a module where the exception occurs in the virtual machine operating system).

103. The exception catching module reports the exception information to a virtual machine monitoring apparatus, so that the virtual machine monitoring apparatus determines, according to the exception information, a policy for resolving the exception corresponding to the exception information, and resolves the exception corresponding to the exception information by using the policy.

Specifically, the virtual machine monitoring apparatus may be provided in a host machine, and the exception catching module directly reports the exception information to the virtual machine monitoring apparatus in the host machine. Alternatively, to reduce the load of the host machine, the virtual machine monitoring apparatus may be separated from the host machine, and the virtual machine monitoring apparatus is connected to the host machine by using a network information channel; and the exception catching module also reports the exception information to the virtual machine monitoring apparatus by using the network information channel.

Specifically, the virtual machine monitoring apparatus may be pre-configured with handling policies corresponding to exceptions of all types. When receiving the exception information, the virtual machine monitoring apparatus may find a corresponding handling policy according to an exception type in the exception information. For example, when the exception type is a deadlock occurring on an operating system of a virtual machine, a corresponding policy may be restarting the operating system of the virtual machine, or the like, which is, however, not limited thereto.

Figure 3:
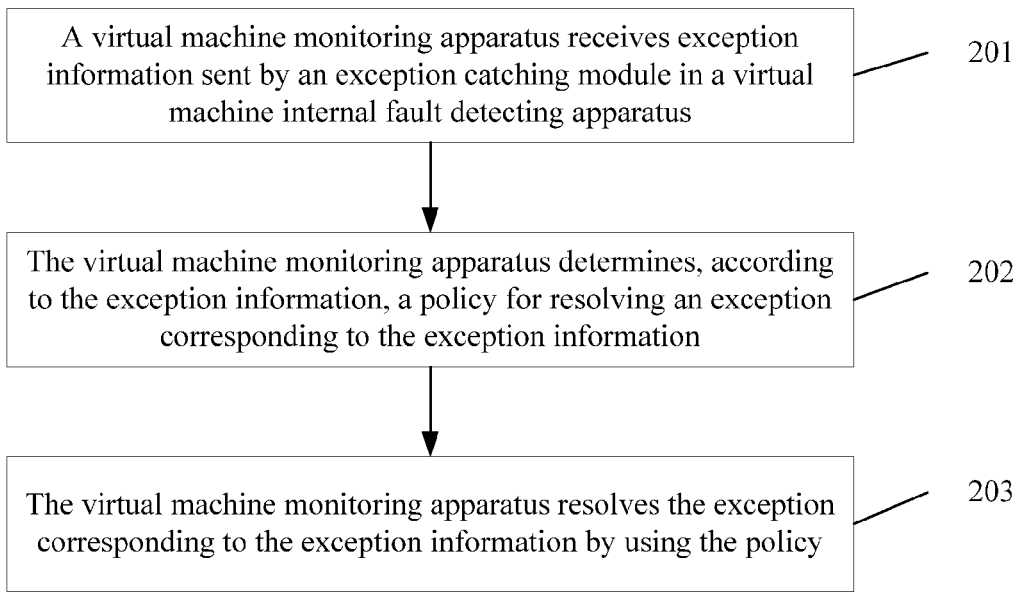
FIG. 3 is a second flowchart of a method for handling a virtual machine internal fault according to an embodiment of the present invention.

As shown in FIG. 3, an embodiment of the present invention provides a method for handling a virtual machine internal fault, where the method includes the following steps when described from the perspective of a virtual machine monitoring apparatus side.

201. A virtual machine monitoring apparatus receives exception information sent by an exception catching module in a virtual machine internal fault detecting apparatus.

202. The virtual machine monitoring apparatus determines, according to the exception information, a policy for resolving an exception corresponding to the exception information.

Specifically, the virtual machine monitoring apparatus may be pre-configured with handling policies corresponding to exceptions of all types. When receiving the exception information, the virtual machine monitoring apparatus may find a corresponding handling policy according to an exception type in the exception information. For example, when the exception type is a deadlock occurring on an operating system of a virtual machine, a corresponding policy may be restarting the operating system of the virtual machine, or the like, which is, however, not limited thereto.

203. The virtual machine monitoring apparatus resolves the exception corresponding to the exception information by using the policy.

Specifically, if a serious fault occurs on an operating system of a virtual machine, for example, all memory of the whole operating system is deadlocked and is all disabled because an interrupt occurs, the virtual machine monitoring apparatus implements, according to a location where the exception occurs, the policy corresponding to the exception type at the location where the exception occurs, for example, directly resets the whole virtual machine operating system.

Alternatively, if a minor fault occurs on an operating system of a virtual machine, for example, operation of the operating system is slowed down due to system disk space insufficiency, the virtual machine monitoring apparatus may, to relieve a running load thereof, send a policy corresponding to the exception type to a virtual machine operation executing module in the virtual machine, so that the virtual machine operation executing module implements the policy corresponding to the exception type in the exception information at a location where the exception occurs. For example, the virtual machine operation executing module cleans up system trashes, thereby providing sufficient disk space for a module whose operation is slowed down.

In the method for handling a virtual machine internal fault according to the embodiment of the present invention, a virtual machine internal fault detecting apparatus monitors a state of a virtual machine operating system; when detecting that the virtual machine operating system encounters an exception, an exception catching module in the virtual machine internal fault detecting apparatus obtains exception information corresponding to the encountered exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

Figure 4:
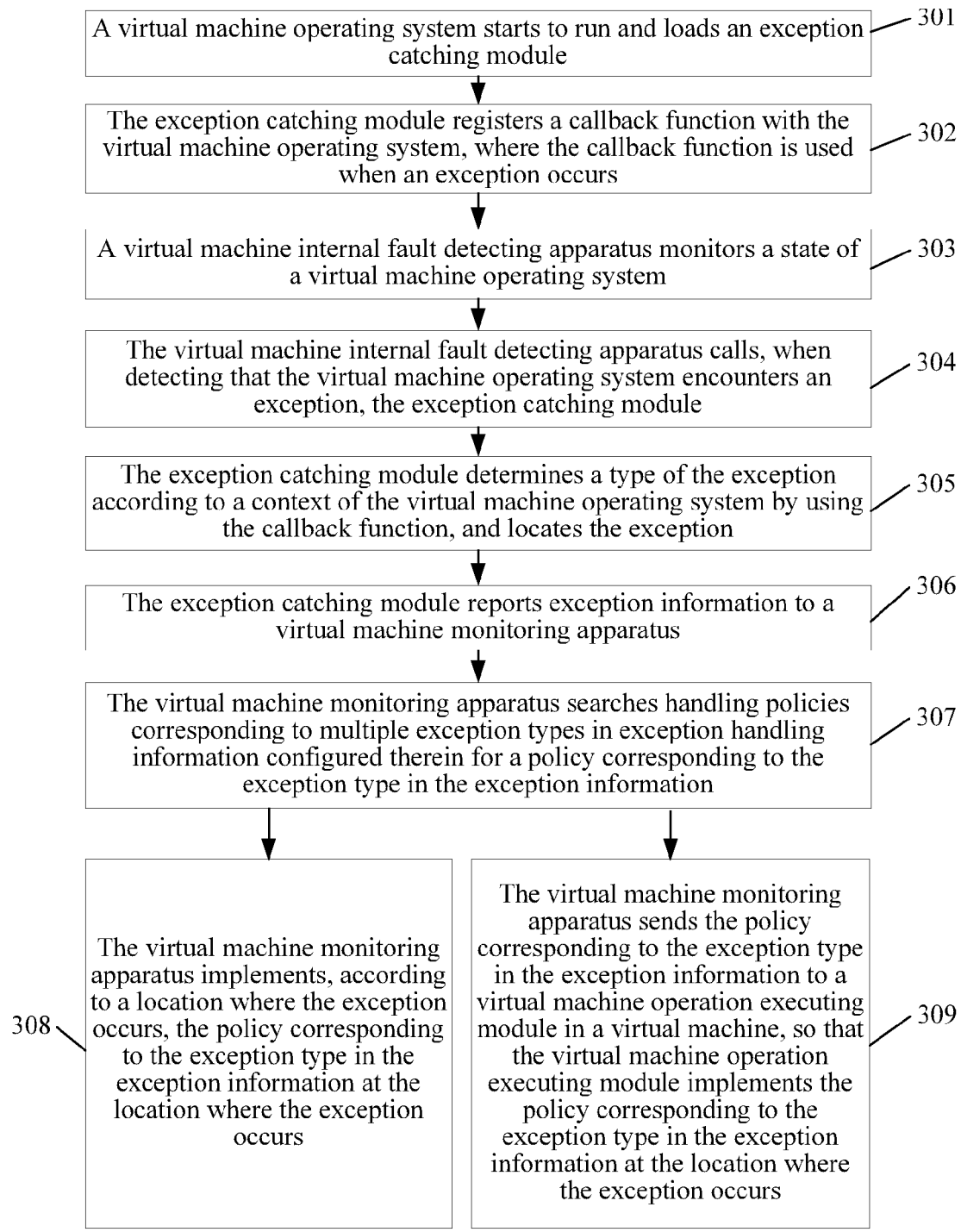
FIG. 4 is a flowchart of a method for handling a virtual machine internal fault according to another embodiment of the present invention.

As shown in FIG. 4, a method for handling a virtual machine internal fault according to another embodiment of the present invention includes the following steps.

301. A virtual machine operating system starts to run and loads an exception catching module.

The exception catching module includes a kernel mode function registered with the virtual machine operating system. Generally, an application program running in a virtual machine operating system exists in a user mode function. When a fault occurs on the application program in the user mode function, the exception catching module including the kernel mode function is not affected.

302. The exception catching module registers a callback function with the virtual machine operating system, where the callback function is used when an exception occurs.

Specifically, by using the callback function, when the virtual machine operating system encounters an exception, the exception catching module may be called.

For example, a callback function or the like upon an occurrence of a blue screen of a system may be registered for a Windows operating system.

303. A virtual machine internal fault detecting apparatus monitors a state of the virtual machine operating system.

304. The virtual machine internal fault detecting apparatus calls, when detecting that the virtual machine operating system encounters an exception, the exception catching module.

305. The exception catching module determines a type of the encountered exception according to a context of the virtual machine operating system by using the callback function, and locates the encountered exception.

Specifically, content of the virtual machine operating system context generally includes information such as a thread, a stack, and memory during system operation, which is, however, not limited thereto.

306. The exception catching module reports exception information to a virtual machine monitoring apparatus.

The exception information includes the exception type and the location where the exception occurs.

Specifically, the virtual machine monitoring apparatus may be provided in a host machine, and the exception catching module directly reports the exception information to the virtual machine monitoring apparatus in the host machine. Alternatively, to relieve a running load of a device of the host machine, the virtual machine monitoring apparatus may be separated from the host machine, and the virtual machine monitoring apparatus is connected to the host machine by using a network information channel; and the exception catching module also reports the exception information to the virtual machine monitoring apparatus by using the network information channel.

In addition, the virtual machine monitoring apparatus may present the exception information to a user, so that the user performs further analysis and processing according to the exception information.

307. The virtual machine monitoring apparatus searches handling policies corresponding to multiple exception types in exception handling information configured therein for a policy corresponding to the exception type in the exception information, and then performs 308 or 309.

Optionally, the virtual machine monitoring apparatus may receive the exception handling information configured therein by a user, where the exception handling information includes handling policies corresponding to multiple exception types. Therefore, after receiving the exception handling information, the virtual machine monitoring apparatus needs to maintain a relationship between the multiple exception types in the exception handling information and the handling policies corresponding thereto, so that the virtual machine monitoring apparatus can, after receiving the exception information, find a corresponding policy according to the exception type carried in the exception information. For example, an exception type is a system deadlock, and a corresponding handling policy is resetting the system. For another example, an exception type is slow operation due to system disk space insufficiency, and a corresponding handling policy is cleaning up trashes in the system to release disk space. The exception handling information also has multiple exception types similar to the foregoing and handling policies corresponding thereto, which will not be described repeatedly herein.

308. The virtual machine monitoring apparatus implements, according to the location where the exception occurs, the policy corresponding to the exception type in the exception information at the location where the exception occurs.

Specifically, if a serious fault occurs on an operating system of a virtual machine, for example, all memory of the whole operating system is deadlocked and is all disabled because an interrupt occurs, the virtual machine monitoring apparatus implements, according to a location where the exception occurs, the policy corresponding to the exception type at the location where the exception occurs, for example, directly resets the whole virtual machine operating system.

Optionally, if the virtual machine monitoring apparatus is separated from the host machine and the virtual machine monitoring apparatus needs to be connected to the host machine by using a network information channel, the virtual machine monitoring apparatus may also control the host machine to implement the policy corresponding to the exception type in the exception information at the location where the exception occurs.

309. The virtual machine monitoring apparatus sends the policy corresponding to the exception type in the exception information to a virtual machine operation executing module in a virtual machine, so that the virtual machine operation executing module implements the policy corresponding to the exception type in the exception information at the location where the exception occurs.

Specifically, if a minor fault occurs on an operating system of a virtual machine, for example, system disk insufficiency slows down operation, the virtual machine monitoring apparatus may, to relieve a running load thereof, send a policy corresponding to the exception type to a virtual machine operation executing module in the virtual machine, so that the virtual machine operation executing module implements the policy corresponding to the exception type in the exception information at a location where the exception occurs. For example, the virtual machine operation executing module cleans up system trashes, thereby providing sufficient disk space for a module whose operation is slowed down.

In the method for handling a virtual machine internal fault according to another embodiment of the present invention, a virtual machine internal fault detecting apparatus monitors a state of a virtual machine operating system; when detecting that the virtual machine operating system encounters an exception, an exception catching module in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

Figure 5:
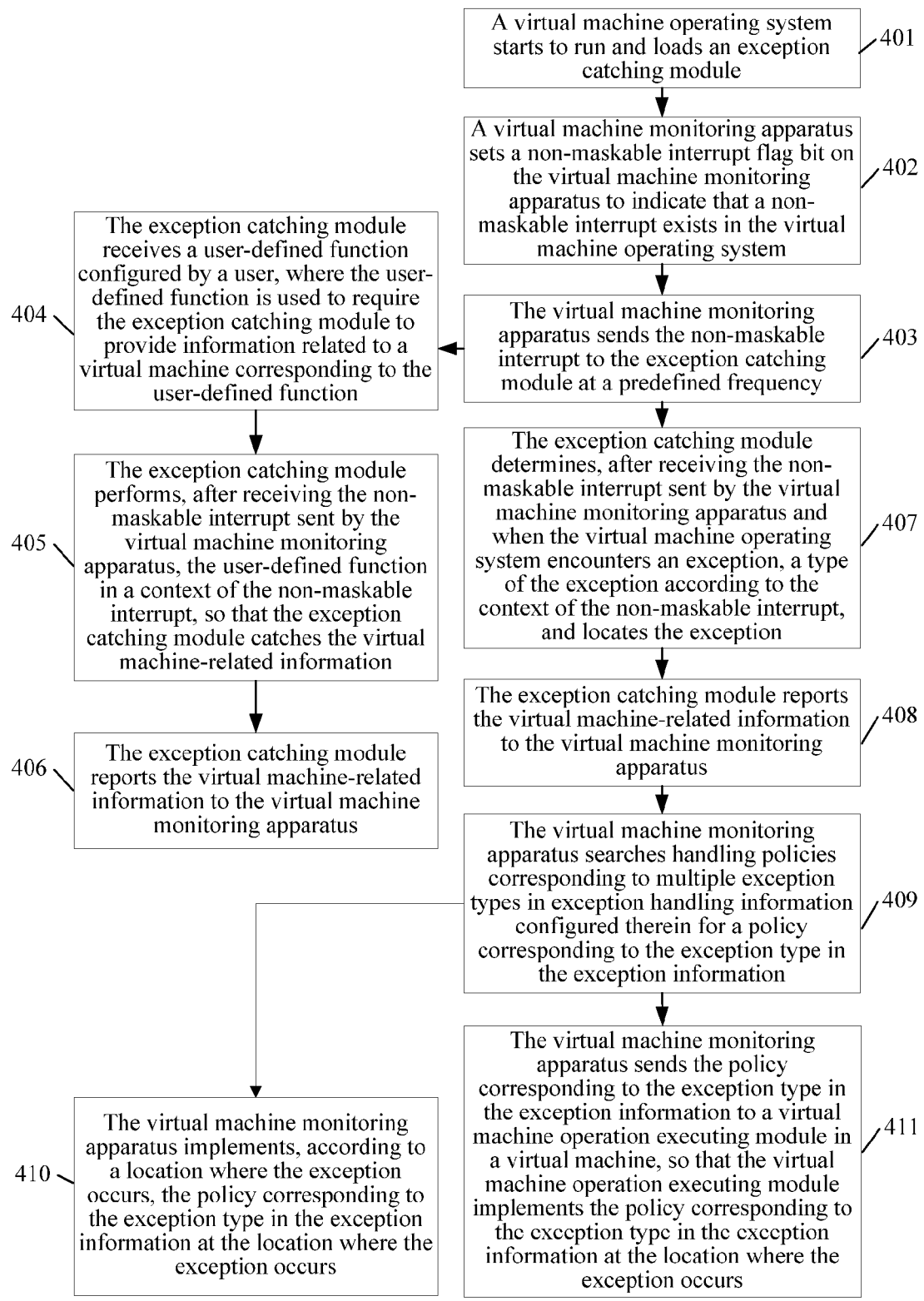
FIG. 5 is a flowchart of a method for handling a virtual machine internal fault according to another embodiment of the present invention.

As shown in FIG. 5, a method for handling a virtual machine internal fault according to another embodiment of the present invention includes the following steps.

401. A virtual machine operating system starts to run and loads an exception catching module.

The exception catching module is an interrupt handling function registered with a non-maskable interrupt in the virtual machine operating system; and the exception catching module can run in a context of the non-maskable interrupt without being affected by a fault occurring in a system.

402. A virtual machine monitoring apparatus sets a non-maskable interrupt flag bit on the virtual machine monitoring apparatus to indicate that a non-maskable interrupt exists in the virtual machine operating system.

Specifically, the virtual machine monitoring apparatus is configured with a non-maskable interrupt watchdog module for hardware, where the non-maskable interrupt watchdog module may set a non-maskable interrupt flag bit in a virtual machine control structure (VMCS) of INTEL or in a virtual machine control block (VMCB) of Advanced Micro Devices (AMD), thereby indicating that a non-maskable interrupt exists in the virtual machine operating system.

403. The virtual machine monitoring apparatus sends the non-maskable interrupt to the exception catching module at a predefined frequency, and then 404 or 407 is performed.

404. The exception catching module receives a user-defined function configured by a user, where the user-defined function is used to require the exception catching module to provide information related to a virtual machine corresponding to the user-defined function.

Specifically, the virtual machine-related information may be information that a user needs to know, such as system health state of the virtual machine, remaining memory space of the virtual machine, and network adapter information of the virtual machine, which is, however, not limited thereto.

405. The exception catching module performs, after receiving the non-maskable interrupt sent by the virtual machine monitoring apparatus, the user-defined function in a context of the non-maskable interrupt, so that the exception catching module catches the virtual machine-related information.

406. The exception catching module reports the virtual machine-related information to the virtual machine monitoring apparatus.

The virtual machine monitoring apparatus may present the obtained virtual machine-related information to a user, so that the user manages and controls the virtual machine according to the virtual machine-related information.

407. The exception catching module determines, after receiving the non-maskable interrupt sent by the virtual machine monitoring apparatus and when the virtual machine operating system encounters an exception, a type of the encountered exception according to the context of the non-maskable interrupt, and locates the encountered exception.

408. The exception catching module reports exception information to the virtual machine monitoring apparatus.

The exception information includes the exception type and the location where the exception occurs.

Specifically, the virtual machine monitoring apparatus may be provided in a host machine, and the exception catching module directly reports the exception information to the virtual machine monitoring apparatus in the host machine. Alternatively, to relieve a running load of a device of the host machine, the virtual machine monitoring apparatus may be separated from the host machine, and the virtual machine monitoring apparatus is connected to the host machine by using a network information channel; and the exception catching module also reports the exception information to the virtual machine monitoring apparatus by using the network information channel.

In addition, the virtual machine monitoring apparatus may present the exception information to a user, so that the user performs further analysis and processing according to the exception information.

409. The virtual machine monitoring apparatus searches handling policies corresponding to multiple exception types in exception handling information configured therein for a policy corresponding to the exception type in the exception information, and then performs 410 or 411.

Optionally, the virtual machine monitoring apparatus may receive the exception handling information configured therein by a user, where the exception handling information includes handling policies corresponding to multiple exception types. Therefore, after receiving the exception handling information, the virtual machine monitoring apparatus needs to maintain a relationship between the multiple exception types in the exception handling information and the handling policies corresponding thereto, so that the virtual machine monitoring apparatus can, after receiving the exception information, find a corresponding policy according to the exception type carried in the exception information. For example, an exception type is a system deadlock, and a corresponding handling policy is resetting the system. For another example, an exception type is slow operation due to system disk space insufficiency, and a corresponding handling policy is cleaning up trashes in the system to release disk space. The exception handling information also has multiple exception types similar to the foregoing and handling policies corresponding thereto, which will not be described repeatedly herein.

410. The virtual machine monitoring apparatus implements, according to the location where the exception occurs, the policy corresponding to the exception type in the exception information at the location where the exception occurs.

Specifically, if a serious fault occurs on an operating system of a virtual machine, for example, all memory of the whole operating system is deadlocked and is all disabled because an interrupt occurs, the virtual machine monitoring apparatus implements, according to a location where the exception occurs, the policy corresponding to the exception type at the location where the exception occurs, for example, directly resets the whole virtual machine operating system.

Optionally, if the virtual machine monitoring apparatus is separated from the host machine, the virtual machine monitoring apparatus may also control the host machine to implement the policy corresponding to the exception type in the exception information at the location where the exception occurs.

411. The virtual machine monitoring apparatus sends the policy corresponding to the exception type in the exception information to a virtual machine operation executing module in a virtual machine, so that the virtual machine operation executing module implements the policy corresponding to the exception type in the exception information at the location where the exception occurs.

Specifically, if a minor fault occurs on an operating system of a virtual machine, for example, system disk insufficiency slows down operation, the virtual machine monitoring apparatus may, to relieve a running load thereof, send a policy corresponding to the exception type to a virtual machine operation executing module in the virtual machine, so that the virtual machine operation executing module implements the policy corresponding to the exception type in the exception information at a location where the exception occurs. For example, the virtual machine operation executing module cleans up system trashes, thereby providing sufficient disk space for a module whose operation is slowed down.

In the method for handling a virtual machine internal fault according to the other embodiment of the present invention, a virtual machine internal fault detecting apparatus monitors a state of a virtual machine operating system; when detecting that the virtual machine operating system encounters an exception, an exception catching module in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception thereby resolving the corresponding exception and preventing the fault from occurring again due to the same reason that causes the previous fault when the virtual machine runs again.

Figure 6:
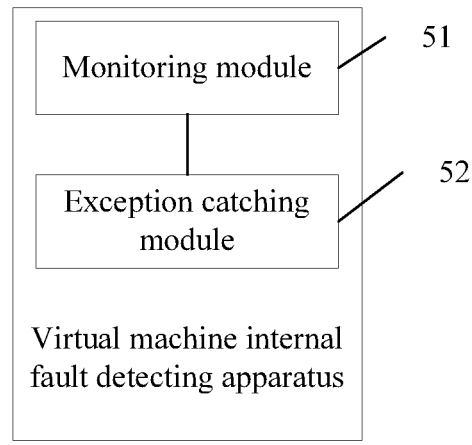
FIG. 6 is first schematic structural diagram of a virtual machine internal fault detecting apparatus according to an embodiment of the present invention.

As shown in FIG. 6, a virtual machine internal fault detecting apparatus according to an embodiment of the present invention includes: a monitoring module 51 configured to monitor a state of a virtual machine operating system, where a specific implementation manner thereof is shown in step 101 in FIG. 2, and will not be described repeatedly herein; and an exception catching module 52 configured to obtain, when the monitoring module 51 detects that the virtual machine operating system encounters an exception, exception information corresponding to the exception according to a context of the virtual machine operating system, where a specific implementation manner thereof is shown in step 102 in FIG. 2, and will not be described repeatedly herein.

The exception catching module 52 is loaded to the virtual machine operating system when the virtual machine operating system is started.

The exception catching module 52 is further configured to report the exception information to a virtual machine monitoring apparatus, so that the virtual machine monitoring apparatus determines, according to the exception information, a policy for resolving the exception corresponding to the exception information, and resolves the exception corresponding to the exception information by using the policy. A specific implementation manner thereof is shown in step 103 in FIG. 2, and will not be described repeatedly herein.

Figure 7:
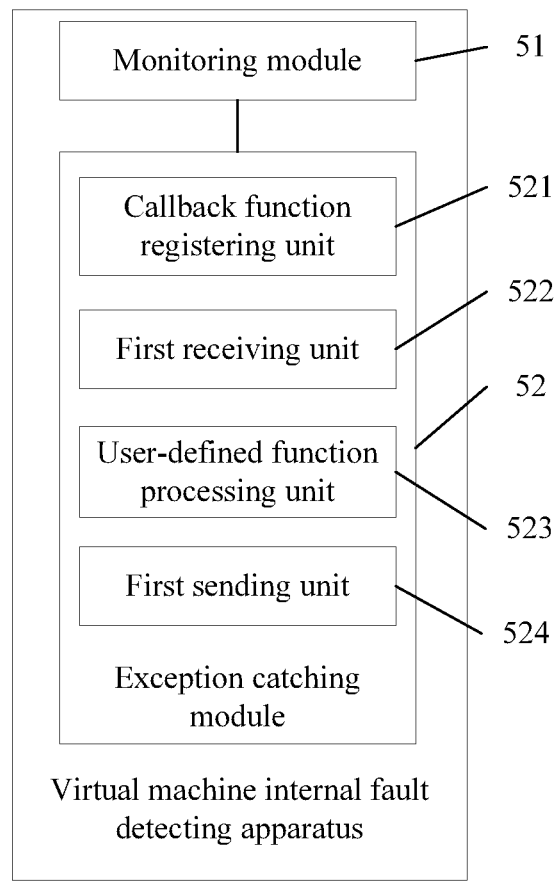
FIG. 7 is second schematic structural diagram of a virtual machine internal fault detecting apparatus according to an embodiment of the present invention.

Specifically, as shown in FIG. 7, the exception catching module 52 includes a kernel mode function registered with the virtual machine operating system, and the exception catching module 52 includes: a callback function registering unit 521 configured to register a callback function with the virtual machine operating system, where the callback function is used when an exception occurs, and a specific implementation manner thereof is shown in step 302 in FIG. 4, and will not be described repeatedly herein.

The exception catching module 52 is specifically configured to determine a type of the exception according to the context of the virtual machine operating system by using the callback function, and locate the exception. A specific implementation manner thereof is shown in step 305 in FIG. 4, and will not be described repeatedly herein.

Specifically, as shown in FIG. 7, the exception catching module 52 is an interrupt handling function registered with a non-maskable interrupt in the virtual machine operating system, and the exception catching module 52 is specifically configured to determine a type of the exception according to a context of a non-maskable interrupt after receiving the non-maskable interrupt sent by the virtual machine monitoring apparatus, and locate the exception. A specific implementation manner thereof is shown in step 407 in FIG. 5, and will not be described repeatedly herein.

Further, as shown in FIG. 7, the exception catching module 52 includes: a first receiving unit 522 configured to receive a user-defined function configured by a user, where the user-defined function is used to require the exception catching module 52 to provide information related to a virtual machine corresponding to the user-defined function, where a specific implementation manner thereof is shown in step 404 in FIG. 5, and will not be described repeatedly herein; a user-defined function processing unit 523 configured to perform the user-defined function in the context of the non-maskable interrupt after receiving the non-maskable interrupt sent by the virtual machine monitoring apparatus, so that the exception catching module catches the virtual machine-related information, where a specific implementation manner thereof is shown in step 405 in FIG. 5, and will not be described repeatedly herein; and a first sending unit 524 configured to report the virtual machine-related information to the virtual machine monitoring apparatus, where a specific implementation manner thereof is shown in step 406 in FIG. 5, and will not be described repeatedly herein.

In the virtual machine internal fault detecting apparatus according to the embodiment of the present invention, the virtual machine internal fault detecting apparatus monitors a state of a virtual machine operating system; when detecting that the virtual machine operating system encounters an exception, an exception catching module in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

Figure 8:
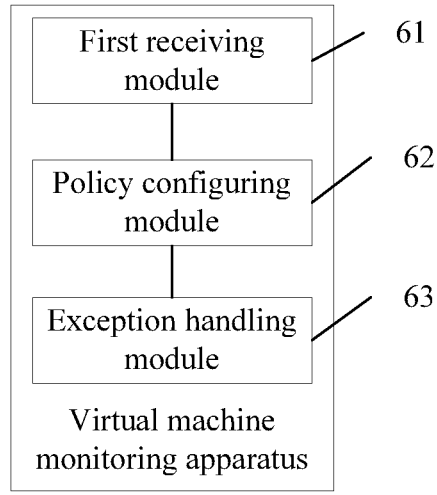
FIG. 8 is a first schematic structural diagram of a virtual machine monitoring apparatus according to an embodiment of the present invention.

As shown in FIG. 8, a virtual machine monitoring apparatus according to an embodiment of the present invention includes: a first receiving module 61 configured to receive exception information sent by an exception catching module in a virtual machine internal fault detecting apparatus, where a specific implementation manner thereof is shown in step 201 in FIG. 3, and will not be described repeatedly herein; a policy configuring module 62 configured to determine, according to the exception information, a policy for resolving an exception corresponding to the exception information, where a specific implementation manner thereof is shown in step 202 in FIG. 3, and will not be described repeatedly herein; and an exception handling module 63 configured to resolve the exception corresponding to the exception information by using the policy, where a specific implementation manner thereof is shown in step 203 in FIG. 3, and will not be described repeatedly herein.

Figure 9:
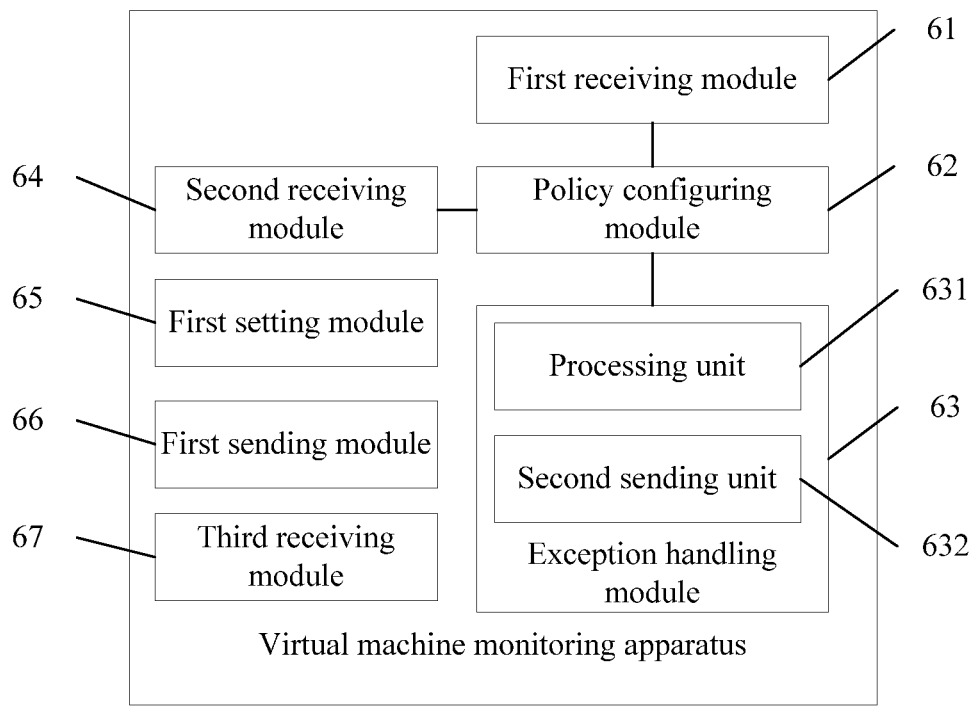
FIG. 9 is a second schematic structural diagram of a virtual machine monitoring apparatus according to an embodiment of the present invention.

Further, as shown in FIG. 9, the virtual machine monitoring apparatus further includes a second receiving module 64 configured to receive exception handling information configured by a user, where the exception handling information includes handling policies corresponding to multiple exception types, where a specific implementation manner thereof is shown in step 307 in FIG. 4, and will not be described repeatedly herein.

Further, as shown in FIG. 9, the exception information includes an exception type and a location where the exception occurs, and the policy configuring module 62 is specifically configured to search the handling policies corresponding to the multiple exception types in the exception handling information for a policy corresponding to the exception type in the exception information. A specific implementation manner thereof is shown in step 307 in FIG. 4, and will not be described repeatedly herein.

The exception handling module 63 includes: a processing unit 631 configured to implement, according to the location where the exception occurs, the policy corresponding to the exception type in the exception information at the location where the exception occurs, where a specific implementation manner thereof is shown in step 308 in FIG. 4, and will not be described repeatedly herein; and a second sending unit 632 configured to send the policy corresponding to the exception type in the exception information to a virtual machine operation executing module in a virtual machine, so that the virtual machine operation executing module implements the policy corresponding to the exception type in the exception information at the location where the exception occurs, where a specific implementation manner thereof is shown in step 309 in FIG. 4, and will not be described repeatedly herein.

Further, as shown in FIG. 9, the virtual machine monitoring apparatus further includes: a first setting module 65 configured to set a non-maskable interrupt flag bit on the virtual machine monitoring apparatus to indicate that a non-maskable interrupt exists in a virtual machine operating system, where a specific implementation manner thereof is shown in step 402 in FIG. 5, and will not be described repeatedly herein; and a first sending module 66 configured to send the non-maskable interrupt to the exception catching module at a predefined frequency, where a specific implementation manner thereof is shown in step 403 in FIG. 5, and will not be described repeatedly herein.

Further, as shown in FIG. 9, the virtual machine monitoring apparatus further includes a third receiving module 67 configured to receive virtual machine-related information sent by the exception catching module, where a specific implementation manner thereof is shown in step 406 in FIG. 5, and will not be described repeatedly herein.

The virtual machine monitoring apparatus according to the embodiment of the present invention receives, when the virtual machine operating system encounters a fault, exception information sent by the exception catching module in the virtual machine internal fault detecting apparatus; determines, according to the exception information, a policy for resolving the exception corresponding to the exception information; and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

Figure 10:
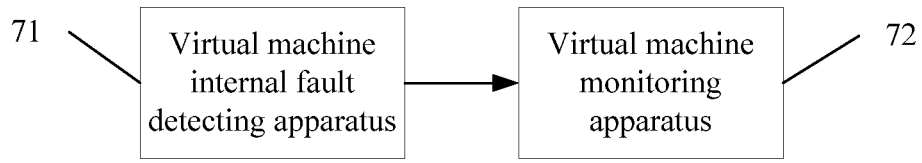
FIG. 10 is schematic structural diagram of a system for handling a virtual machine internal fault according to an embodiment of the present invention.

As shown in FIG. 10, a system for handling a virtual machine internal fault according to an embodiment of the present invention includes a virtual machine internal fault detecting apparatus 71 and a virtual machine monitoring apparatus 72, where the virtual machine internal fault detecting apparatus 71 is configured to monitor a state of a virtual machine operating system; when detecting that the virtual machine operating system encounters an exception, obtain exception information corresponding to the exception according to a context of the virtual machine operating system; and report the exception information to the virtual machine monitoring apparatus 72; and the virtual machine monitoring apparatus 72 is configured to receive the exception information sent by the exception catching module in the virtual machine internal fault detecting apparatus 71; determine, according to the exception information, a policy for resolving the exception corresponding to the exception information; and resolve the exception corresponding to the exception information by using the policy.

It should be noted that, for a specific implementation manner of the system for handling a virtual machine internal fault according to the embodiment of the present invention, refer to specific embodiments of the virtual machine internal fault detecting apparatus and the virtual machine monitoring apparatus described above, which will not be described repeatedly herein.

In the system for handling a virtual machine internal fault according to the embodiment of the present invention, a virtual machine internal fault detecting apparatus monitors a state of a virtual machine operating system; when detecting that the virtual machine operating system encounters an exception, an exception catching module in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

In order to enable a person skilled in the art to have a better understanding of the virtual machine internal fault detecting apparatus according to the embodiments of the present invention, the virtual machine internal fault detecting apparatus is provided for description.

Figure 11:
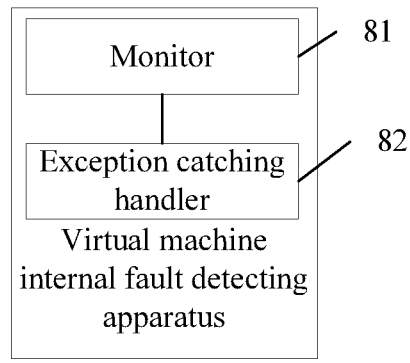
FIG. 11 is schematic structural diagram of a virtual machine internal fault detecting apparatus according to an embodiment of the present invention.

As shown in FIG. 11, a virtual machine internal fault detecting apparatus according to an embodiment of the present invention includes: a monitor 81 configured to monitor a state of a virtual machine operating system, where a specific implementation manner thereof is shown in step 101 in FIG. 2, and will not be described repeatedly herein; and an exception catching handler 82 configured to obtain, when the monitor 81 detects that the virtual machine operating system encounters an exception, exception information corresponding to the exception according to a context of the virtual machine operating system, where a specific implementation manner thereof is shown in step 102 in FIG. 2, and will not be described repeatedly herein.

The exception catching handler 82 is loaded to the virtual machine operating system when the virtual machine operating system is started.

The exception catching handler 82 is further configured to report the exception information to a virtual machine monitoring apparatus, so that the virtual machine monitoring apparatus determines, according to the exception information, a policy for resolving the exception corresponding to the exception information, and resolves the exception corresponding to the exception information by using the policy. A specific implementation manner thereof is shown in step 103 in FIG. 2, and will not be described repeatedly herein.

Specifically, as shown in FIG. 11, the exception catching handler 82 includes a kernel mode function registered with the virtual machine operating system, and the exception catching handler 82, is specifically configured to register a callback function with the virtual machine operating system, where the callback function is used when an exception occurs, and a specific implementation manner thereof is shown in step 302 in FIG. 4, and will not be described repeatedly herein; and determine a type of the exception according to the context of the virtual machine operating system by using the callback function, and locate the exception, where a specific implementation manner thereof is shown in step 305 in FIG. 4, and will not be described repeatedly herein.

Specifically, as shown in FIG. 11, the exception catching handler 82 is an interrupt handling function registered with a non-maskable interrupt in the virtual machine operating system, and the exception catching handler 82 is specifically configured to determine a type of the exception according to a context of a non-maskable interrupt after receiving the non-maskable interrupt sent by the virtual machine monitoring apparatus, and locate the exception. A specific implementation manner thereof is shown in step 407 in FIG. 5, and will not be described repeatedly herein.

Further, as shown in FIG. 11, the exception catching handler 82 is specifically configured to receive a user-defined function configured by a user, where the user-defined function is used to require the exception catching handler to provide information related to a virtual machine corresponding to the user-defined function, where a specific implementation manner thereof is shown in step 404 in FIG. 5, and will not be described repeatedly herein; perform, after receiving a non-maskable interrupt sent by the virtual machine monitoring apparatus, the user-defined function in a context of the non-maskable interrupt, so that the exception catching handler catches the virtual machine-related information, where a specific implementation manner thereof is shown in step 405 in FIG. 5, and will not be described repeatedly herein; and report the virtual machine-related information to the virtual machine monitoring apparatus, where a specific implementation manner thereof is shown in step 406 in FIG. 5, and will not be described repeatedly herein.

In the virtual machine internal fault detecting apparatus according to the embodiment of the present invention, the virtual machine internal fault detecting apparatus monitors a state of a virtual machine operating system; when detecting that the virtual machine operating system encounters an exception, an exception catching handler in the virtual machine internal fault detecting apparatus obtains exception information corresponding to the exception according to a context of the virtual machine operating system, and reports the exception information to a virtual machine monitoring apparatus, so that the virtual machine monitoring apparatus determines, according to the exception information, a policy for resolving the exception corresponding to the exception information, and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

In order to enable a person skilled in the art to have a better understanding of the virtual machine monitoring apparatus according to the embodiments of the present invention, the virtual machine monitoring apparatus is provided for description.

Figure 12:
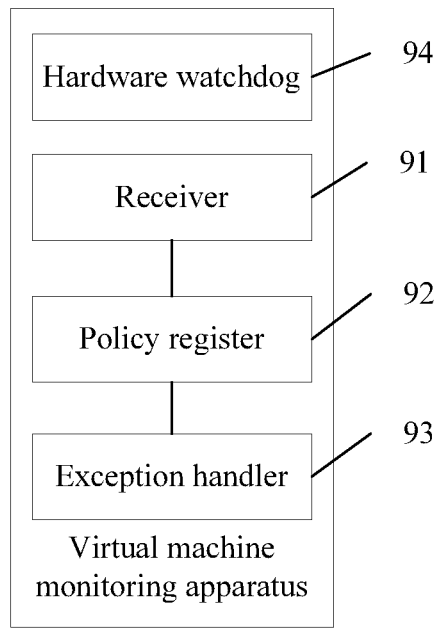
FIG. 12 is a schematic structural diagram of a virtual machine monitoring apparatus according to an embodiment of the present invention.

As shown in FIG. 12, a virtual machine monitoring apparatus according to an embodiment of the present invention includes a receiver 91 configured to receive exception information sent by an exception catching handler in a virtual machine internal fault detecting apparatus, where a specific implementation manner thereof is shown in step 201 in FIG. 3, and will not be described repeatedly herein; a policy register 92 configured to determine, according to the exception information, a policy for resolving an exception corresponding to the exception information, where a specific implementation manner thereof is shown in step 202 in FIG. 3, and will not be described repeatedly herein; and an exception handler 93 configured to resolve the exception corresponding to the exception information by using the policy, where a specific implementation manner thereof is shown in step 203 in FIG. 3, and will not be described repeatedly herein.

Further, as shown in FIG. 12, the receiver 91 is further configured to receive exception handling information configured by a user, where the exception handling information includes handling policies corresponding to multiple exception types. A specific implementation manner thereof is shown in step 307 in FIG. 4, and will not be described repeatedly herein.

Further, as shown in FIG. 12, the exception information includes an exception type and a location where the exception occurs, and the policy register 92 is specifically configured to search the handling policies corresponding to the multiple exception types in the exception handling information for a policy corresponding to the exception type in the exception information. A specific implementation manner thereof is shown in step 307 in FIG. 4, and will not be described repeatedly herein.

The exception handler 93 is specifically configured to implement, according to the location where the exception occurs, the policy corresponding to the exception type in the exception information at the location where the exception occurs, where a specific implementation manner thereof is shown in step 308 in FIG. 4, and will not be described repeatedly herein; and send the policy corresponding to the exception type in the exception information to a virtual machine operation executing module in a virtual machine, so that the virtual machine operation executing module implements the policy corresponding to the exception type in the exception information at the location where the exception occurs, where a specific implementation manner thereof is shown in step 309 in FIG. 4, and will not be described repeatedly herein.

Further, as shown in FIG. 12, the virtual machine monitoring apparatus further includes a hardware watchdog 94 configured to set a non-maskable interrupt flag bit on the virtual machine monitoring apparatus to indicate that a non-maskable interrupt exists in a virtual machine operating system, where a specific implementation manner thereof is shown in step 402 in FIG. 5, and will not be described repeatedly herein.

The hardware watchdog 94 is further configured to send the non-maskable interrupt to the exception catching handler at a predefined frequency. A specific implementation manner thereof is shown in step 403 in FIG. 5, and will not be described repeatedly herein.

Further, as shown in FIG. 12, the receiver 91 is further configured to receive virtual machine-related information sent by the exception catching handler. A specific implementation manner thereof is shown in step 406 in FIG. 5, and will not be described repeatedly herein.

The virtual machine monitoring apparatus according to the embodiment of the present invention receives, when the virtual machine operating system encounters a fault, exception information sent by the exception catching handler in the virtual machine internal fault detecting apparatus; determines, according to the exception information, a policy for resolving the exception corresponding to the exception information; and resolves the exception corresponding to the exception information by using the policy. In this way, the embodiment of the present invention, by using the obtained exception information, makes it more accurate to determine whether an internal running fault occurs on a virtual machine, and the internal running fault occurring on the virtual machine can be found in a timely manner; in addition, the virtual machine monitoring apparatus determines, according to the exception information, the policy for resolving the exception, thereby resolving the corresponding exception and preventing the fault from occurring again due to the same reason that causes the previous fault when the virtual machine runs again.

Through the foregoing description of the embodiments, it is clear to a person skilled in the art that the present invention may be implemented by software plus necessary universal hardware, and definitely may also be implemented by hardware, but in many cases, the software implementation is an exemplary embodiment. Based on such an understanding, the technical solutions of the present invention essentially, or the part contributing to the prior art may be implemented in a form of a software product. The computer software product is stored in a readable storage medium, for example, a floppy disk, a hard disk, or an optical disk of the computer, and includes several instructions for instructing a computer device (which may be a personal computer, a server, or a network device or the like) to perform the methods described in the embodiments of the present invention.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for handling a virtual machine internal fault, comprising:
receiving, by a virtual machine monitoring apparatus, exception handling information configured by a user, wherein the exception handling information comprises handling policies corresponding to multiple exception types:
receiving, by the virtual machine monitoring apparatus, exception information sent by an exception catching module in a virtual machine internal fault detecting apparatus:

determining, by the virtual machine monitoring apparatus and according to the exception information, a policy for resolving an exception corresponding to the exception information; and resolving, by the virtual machine monitoring apparatus, the exception corresponding to the exception information by using the policy, wherein the exception information comprises an exception type and a location where the exception occurs, wherein determining the policy for resolving the exception corresponding to the exception information comprises searching, by the virtual machine monitoring apparatus, the handling policies corresponding to the multiple exception types in the exception handling information for the policy corresponding to the exception type in the exception information, and wherein resolving, by the virtual machine monitoring apparatus, the exception corresponding to the exception information by using the policy comprises implementing, by the virtual machine monitoring apparatus and according to the location where the exception occurs, the policy corresponding to the exception type in the exception information at the location where the exception occurs.

2. The method according to claim 1, wherein before receiving the exception information sent by the exception catching module in the virtual machine internal fault detecting apparatus, the method comprises:

setting, by the virtual machine monitoring apparatus, a non-maskable interrupt flag bit on the virtual machine monitoring apparatus to indicate that a non-maskable interrupt exists in a virtual machine operating system; and sending, by the virtual machine monitoring apparatus, the non-maskable interrupt to the exception catching module at a predefined frequency.

3. The method according to claim 2, wherein after sending the non-maskable interrupt to the exception catching module at a predefined frequency, the method comprises receiving, by the virtual machine monitoring apparatus, virtual machine-related information sent by the exception catching module.

4. A method for handling a virtual machine internal fault, comprising:

receiving, by a virtual machine monitoring apparatus, exception handling information configured by a user, wherein the exception handling information comprises handling policies corresponding to multiple exception types;

receiving, by the virtual machine monitoring apparatus, exception information sent by an exception catching module in a virtual machine internal fault detecting apparatus;

determining, by the virtual machine monitoring apparatus and according to the exception information, a policy for resolving an exception corresponding to the exception information; and resolving, by the virtual machine monitoring apparatus, the exception corresponding to the exception information by using the policy, wherein the exception information comprises an exception type and a location where the exception occurs, wherein determining the policy for resolving the exception corresponding to the exception information comprises searching, by the virtual machine monitoring apparatus, the handling policies corresponding to the multiple exception types in the exception handling information for the policy corresponding to the exception type in the exception information, and wherein resolving, by the virtual machine monitoring apparatus, the exception corresponding to the exception information by using the policy comprises sending, by the virtual machine monitoring apparatus, the policy corresponding to the exception type in the exception information to a virtual machine operation executing module in a virtual machine so that the virtual machine operation executing module implements the policy corresponding to the exception type in the exception information at the location where the exception occurs.

5. The method according to claim 4, wherein before receiving the exception information sent by the exception catching module in the virtual machine internal fault detecting apparatus, the method comprises:

setting, by the virtual machine monitoring apparatus, a non-maskable interrupt flag bit on the virtual machine monitoring apparatus to indicate that a non-maskable interrupt exists in a virtual machine operating system; and sending, by the virtual machine monitoring apparatus, the non-maskable interrupt to the exception catching module at a predefined frequency.

6. The method according to claim 5, wherein after sending the non-maskable interrupt to the exception catching module at a predefined frequency, the method comprises receiving, by the virtual machine monitoring apparatus, virtual machine-related information sent by the exception catching module.

7. A computer system, comprising a memory configured to store a program and a processor configured to read the program from the memory to:

receive exception handling information configured by a user, wherein the exception handling information comprises handling policies corresponding to multiple exception types;

receive exception information sent by an exception catching module in a virtual machine internal fault detecting apparatus, wherein the exception information comprises an exception type and a location where the exception occurs;

search the handling policies corresponding to the multiple exception types in the exception handling information for a policy corresponding to the exception type in the exception information; and implement, according to the location where the exception occurs, the policy corresponding to the exception type in the exception information at the location where the exception occurs.

8. The computer system according to claim 7, wherein the processor is further configured to:

set, by the virtual machine monitoring apparatus, a non-maskable interrupt flag bit on the virtual machine monitoring apparatus to indicate that a non-maskable interrupt exists in a virtual machine operating system; and send, by the virtual machine monitoring apparatus, the non-maskable interrupt to the exception catching module at a predefined frequency.

9. The computer system according to claim 8, wherein the processor is further configured to receive, by the virtual machine monitoring apparatus, virtual machine-related information sent by the exception catching module.

10. A computer system, comprising a memory configured to store a program and a processor configured to read the program from the memory and perform the steps of:

receive exception handling information configured by a user, wherein the exception handling information comprises handling policies corresponding to multiple exception types;
receive exception information sent by an exception catching module in a virtual machine internal fault detecting apparatus, wherein the exception information comprises an exception type and a location where the exception occurs;
search the handling policies corresponding to the multiple exception types in the exception handling information for a policy corresponding to the exception type in the exception information; and
send the policy corresponding to the exception type in the exception information to a virtual machine operation executing module in a virtual machine so that the virtual machine operation executing module implements the policy corresponding to the exception type in the exception information at the location where the exception occurs.

11. The computer system according to claim 10, wherein the processor is further configured to:
set, by the virtual machine monitoring apparatus, a non-maskable interrupt flag bit on the virtual machine monitoring apparatus to indicate that a non-maskable interrupt exists in a virtual machine operating system; and
send, by the virtual machine monitoring apparatus, the non-maskable interrupt to the exception catching module at a predefined frequency.

12. The computer system according to claim 11, wherein the processor is further configured to receive, by the virtual machine monitoring apparatus, virtual machine-related information sent by the exception catching module.

13. A non-transitory storage medium for storing a computer-readable program, wherein when the program is read by one or more processors of a computer to cause the computer to:
receive exception handling information configured by a user, wherein the exception handling information comprises handling policies corresponding to multiple exception types;
receive exception information sent by an exception catching module in a virtual machine internal fault detecting apparatus, wherein the exception information comprises an exception type and a location where the exception occurs;
search the handling policies corresponding to the multiple exception types in the exception handling information for a policy corresponding to the exception type in the exception information; and
implement, according to the location where the exception occurs, the policy corresponding to the exception type in the exception information at the location where the exception occurs.

14. A non-transitory storage medium for storing a computer-readable program, wherein when the program is read by one or more processors of a computer to cause the computer to:
receive exception handling information configured by a user, wherein the exception handling information comprises handling policies corresponding to multiple exception types;
receive exception information sent by an exception catching module in a virtual machine internal fault detecting apparatus, wherein the exception information comprises an exception type and a location where the exception occurs;
search the handling policies corresponding to the multiple exception types in the exception handling information for a policy corresponding to the exception type in the exception information; and
send the policy corresponding to the exception type in the exception information to a virtual machine operation executing module in a virtual machine so that the virtual machine operation executing module implements the policy corresponding to the exception type in the exception information at the location where the exception occurs.

\* \* \* \* \*